United States Patent
Nishi

(10) Patent No.: US 10,805,304 B2
(45) Date of Patent: Oct. 13, 2020

(54) EDGE SERVER AND MANAGEMENT SERVER

(71) Applicant: FANUC CORPORATION, Minamitsuru-gun, Yamanashi (JP)

(72) Inventor: Hiroji Nishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 128 days.

(21) Appl. No.: 16/116,104

(22) Filed: Aug. 29, 2018

(65) Prior Publication Data
US 2019/0075116 A1 Mar. 7, 2019

(30) Foreign Application Priority Data
Sep. 6, 2017 (JP) ................................. 2017-171061

(51) Int. Cl.
| | | |
|---|---|---|
| H04L 29/06 | (2006.01) | |
| H04L 29/08 | (2006.01) | |
| G06F 21/62 | (2013.01) | |
| G06F 21/50 | (2013.01) | |

(52) U.S. Cl.
CPC ............ H04L 63/102 (2013.01); G06F 21/50 (2013.01); G06F 21/629 (2013.01); G06F 21/6218 (2013.01); H04L 63/08 (2013.01); H04L 63/101 (2013.01); H04L 63/105 (2013.01); G06F 2221/2141 (2013.01); H04L 63/20 (2013.01)

(58) Field of Classification Search
None
See application file for complete search history.

(56) References Cited

U.S. PATENT DOCUMENTS

| | | | |
|---|---|---|---|
| 2016/0065585 A1* | 3/2016 | Della Corte | .......... H04L 63/108 726/4 |
| 2019/0007306 A1* | 1/2019 | Kojima | ............... G06F 9/45558 |

FOREIGN PATENT DOCUMENTS

| | | |
|---|---|---|
| CN | 102420690 | 4/2012 |
| CN | 102457521 | 5/2012 |
| CN | 102930226 | 2/2013 |
| CN | 106527353 | 3/2017 |

(Continued)

OTHER PUBLICATIONS

Notification of Reasons for Refusal dated May 21, 2019 in Japanese Patent Application No. 2017-171061.

(Continued)

*Primary Examiner* — Joseph P Hirl
*Assistant Examiner* — Hassan Saadoun
(74) *Attorney, Agent, or Firm* — Wenderoth, Lind & Ponack, L.L.P.

(57) ABSTRACT

An edge server includes: an application execution management unit that manages execution of an application that uses a function of an edge device and/or access processing data of the edge device; a skill information acquisition unit that acquires skill information of a user who is authorized to log into a system including the edge server; and an access control unit determines whether the user has an access right to use the function of the edge device and/or access the processing data of the edge device on the basis of the skill information of the user and a skill-based access list for the use of the function of the edge device and the access to the processing data of the edge device and allows the access when it is determined that the user has the access right.

13 Claims, 10 Drawing Sheets

(56) References Cited

FOREIGN PATENT DOCUMENTS

| | | |
|---|---|---|
| JP | 10-111833 | 4/1998 |
| JP | 2000-112891 | 4/2000 |
| JP | 2002-279057 | 9/2002 |
| JP | 2004-062610 | 2/2004 |
| JP | 4865642 | 2/2012 |
| JP | 2015-125745 | 7/2015 |
| JP | 2017-91107 | 5/2017 |

OTHER PUBLICATIONS

Office Action dated Apr. 16, 2020 in Chinese Patent Application No. 201811027020.2.

* cited by examiner

FIG. 3

| LIST ITEM | |
|---|---|
| ☐ CAN DISPLAY PRESENT STATE OF MANUFACTURING APPARATUS | PROCESSING DATA |
| ☐ CAN STORE PRESENT STATE OF MANUFACTURING APPARATUS | |
| ☐ CAN DISPLAY MANUFACTURING HISTORY | |
| ☐ CAN STORE MANUFACTURING HISTORY | |
| ☐ CAN DISPLAY PRODUCT QUALITY INFORMATION | |
| ☐ CAN STORE PRODUCT QUALITY INFORMATION | |
| ... | |
| ☐ CAN ISSUE INSTRUCTION ON STARTING AND STOPPING MANUFACTURING | FUNCTION |
| ☐ CAN DISPLAY MANUFACTURING PROGRAM | |
| ☐ CAN CHANGE MANUFACTURING PROGRAM | |
| ☐ CAN STORE MANUFACTURING PROGRAM | |
| ☐ CAN DISPLAY SETTING OF MANUFACTURING APPARATUS | |
| ☐ CAN CHANGE SETTING OF MANUFACTURING APPARATUS | |
| ☐ CAN STORE SETTING OF MANUFACTURING APPARATUS | |
| ☐ CAN CONTROL MANUFACTURING APPARATUS AT REMOTE SITE | |
| ☐ CAN MAINTAIN MANUFACTURING APPARATUS AT REMOTE SITE | |
| ☐ CAN UPLOAD DATA TO INTERNET | |
| ☐ CAN DOWNLOAD DATA FROM INTERNET | |
| ☐ CAN RECORD COMMUNICATION DATA | |
| ☐ CAN RELAY COMMUNICATION DATA | |
| ... | |

CNC DATA MODEL 630

| CATEGORY | COMMON DATA | PART DATA |
|---|---|---|
| OPERATING STATE INFORMATION | OPERATING STATE<br>OPERATING STATE CNC | OPERATING STATE OF CNC SYSTEM<br>OPERATING STATE OF CNC SHAFT<br>OPERATING STATE OF CNC MOTOR<br>OPERATING STATE OF SENSORS<br>… |
| PRODUCTION STATE INFORMATION | PRODUCTION STATE | — |
| QUALITY MAINTENANCE INFORMATION | QUALITY MAINTENANCE INFORMATION<br>QUALITY MAINTENANCE INFORMATION CNC | QUALITY MAINTENANCE INFORMATION OF CNC SYSTEM<br>QUALITY MAINTENANCE INFORMATION OF CNC SHAFT<br>QUALITY MAINTENANCE INFORMATION OF CNC MOTOR<br>QUALITY MAINTENANCE INSPECTION RESULT<br>… |
| INFORMATION ON VARIOUS EVENTS | OPERATION HISTORY<br>PROGRAM CHANGE HISTORY<br>ALARM HISTORY<br>MAINTENANCE NOTIFICATION EVENT<br>FAILURE FORECAST EVENT<br>… | — |
| ARCHIVE | MAINTENANCE SPECIFICATION ARCHIVE<br>… | INDIVIDUAL ARCHIVES<br>… |

EDGE SERVER AND MANAGEMENT SERVER

This application is based on and claims the benefit of priority from Japanese Patent Application No. 2017-171061, filed on 6 Sep. 2017, the content of which is incorporated herein by reference.

BACKGROUND OF THE INVENTION

Field of the Invention

The present invention relates to an edge server and a management server.

Related Art

Recently, in a field of a manufacturing apparatus, server application software products (hereinafter simply referred to as "applications" or "apps") having various functions and purposes to be used in manufacturing sites have been developed by various companies. Applications are often developed by taking use cases of user's into consideration. Examples of developed applications include a manufacturing line management application dedicated for an administrator of a manufacturing site, a maintenance support application dedicated for a maintenance service engineer of a manufacturing apparatus, and a network setting support application dedicated for a network integrator. When users use a computer, such measures that users perform sign-on by inputting their user name and password and the like to verify whether the user is a person who has been registered in advance so that the computer is not used illegally by malicious persons are generally performed. Sign-on may be performed once before a user starts using a computer or may be performed once before a user starts using an application using a computer. General sign-on is performed by an administrator such as a plant manager registering the user information and password of a user of a computer or an application in advance in a management server on a cloud, for example. Even when a number of computers or applications are present, a user transmits user information and a password to a management server during sign-on to computers or applications to inquire whether the user is registered or not. Thus, it is not necessary to register users for respective computers and applications.

In general sign-on, once a user is allowed to use a computer or an application, the user can use all functions of the computer or the application. However, there may be a case in which on the basis of a functional risk of an application, only some of the users who could sign on to the application are allowed to use a high-risk function and the other users are not allowed to use the same. In order to solve such a problem, for example, Patent Document 1 discloses a technique of restricting a usable function of an application depending on the role of a user. Specifically, an information processing device disclosed in Patent Document 1 has a role assigned to an administrator and a role assigned to general users and restricts a function usable by a logged-in user according to a role.

Patent Document 1: Japanese Unexamined Patent Application, Publication No. 2017-91107

SUMMARY OF THE INVENTION

For example, an operation of setting various parameters of a manufacturing apparatus in a manufacturing line is an operation having a high functional risk. Due to this, in an application used for manufacturing line operations dedicated for an operator in a manufacturing site, only a skilled operator who has received sufficient training may be allowed to perform a high-risk operation and other operators may be allowed to perform a low-risk operation of monitoring an operation state of a manufacturing apparatus. In a maintenance support application dedicated for a maintenance service engineer of a manufacturing apparatus, a maintenance operator may be defined for respective lines or stations in which manufacturing apparatuses are installed, and an operator may be allowed to perform a maintenance operation using an application with respect to a manufacturing apparatus installed in a responsible range of lines or stations. When an operator who is allowed to perform a maintenance operation is defined for respective manufacturers of manufacturing apparatuses, it is necessary to allow only an operator who has received safety and maintenance training related to operation of a manufacturing apparatus to use an application for remote-controlling a manufacturing apparatus of the corresponding manufacturer.

However, in the conventional technique, it is difficult to restrict a function on the basis of the skill of an operator in a detailed manner. An object of the present invention is to provide an edge server and a management server which enable a function executed by an application to be restricted according to the skill of an operator or a user in a detailed manner.

(1) An edge server (for example, an "edge server 100" to be described later) of the present invention is communicably connected to one or more edge devices (400) and includes: an application execution management unit (for example, an "application execution management unit 111" to be described later) that manages execution of an application that uses a function of the edge device and/or processing data of the edge device, the application being operated by the edge server; an application storage unit (for example, an "application storage unit 121" to be described later) that stores the application; an access control storage unit (for example, an "access control storage unit 123" to be described later) that stores a predetermined skill-information-based access control list (for example, a "skill-based access list" to be described later) for the use of the function of the edge device and/or the processing data of the edge device; a skill information acquisition unit (for example, a "skill information acquisition unit 112" to be described later) that acquires skill information of a user who is authorized to log into a system including the edge server; and an access control unit (for example, an "access control unit 113" to be described later) determines whether the user has an access right to use the function of the edge device and/or access the processing data of the edge device on the basis of the skill information of the user and the skill-information-based access control list stored in the access control storage unit when the user issues a request for the use of the function of the edge device and/or the access to the processing data of the edge device via the application and allows the user to use the function of the edge device and/or access the processing data of the edge device via the application when it is determined that the user has the access right.

(2) in the edge server (for example, an "edge server 100" to be described later) according to (1), the skill-information-based access control list (for example, a "skill-based access list" to be described later) may include accessibility information on accessibility to a type and/or an installation group of the edge device (for example, an "edge device 400" to be described later) for each piece of skill information.

(3) In the edge server (for example, an "edge server 100" to be described later) according to (1) or (2), the skill information acquisition unit (for example, a "skill information acquisition unit 112" to be described later) may be communicably connected to the edge server to acquire the skill information of the user from a management server (for example, a "management server 300" to be described later) that manages users of a system including the edge server.

(4) The edge server (for example, an "edge server 100" to be described later) according to (3) may further include a management agent (for example, a "management agent 150" to be described later) which is an agent, of the management server (for example, a "management server 300" to be described later) that manages users of a system including the edge server, and the skill information acquisition unit (for example, a "skill information acquisition unit. 112" to be described later) may acquire the skill information of the user from the management agent.

(5) In the edge server (for example, an "edge server 100" to be described later) according to any one of (1) to (4), the skill-information-based access control list (for example, a "skill-based access list" to be described later) may include for each piece of skill information: usability information of each function related to an operating state of the edge device (for example, an "edge device 400" to be described later) and/or accessibility information of each piece of processing data; usability information of each function related to a production state of the edge device and/or accessibility information of each piece of processing data; usability information of each function related to quality maintenance of the edge device and/or accessibility information of each piece of processing data; usability information of each function related to an event (history) of the edge device and/or accessibility information of each piece of processing data; and usability information of each function related to an archive of the edge device and/or accessibility information of each piece of processing data.

(6) In the edge server (for example, an "edge server 100" to be described later) according to any one of (1) to (5), the skill information may further include information on qualification of each user, information on a group to which the user belongs, information on the edge device that the user can operate, information on a content of an operation that the user can perform, and information on user's completion of a training course.

(7) In the edge server (for example, an "edge server 100" to be described later) according to any one of (1) to (6), the application may cause the edge server to function as the access control unit (for example, an "access control unit 113" to be described later).

(8) In the edge server (for example, an "edge server 100" to be described later) according to any one of (1) to (7), the application storage unit (for example, an "application storage unit 121" to be described later) may store a security risk list (for example, an "access report list" to be described later) related to the application and the application's usability of the function of the edge device (for example, an "edge device 400" to be described later) and/or the application's accessibility to the processing data of the edge device, and the access control unit (for example, an "access control unit 113" to be described later) may monitor a request for the use of the function of the edge device and/or the access to the processing data of the edge device on the basis of a content of the security risk list and allow the request for the use of the function related to the edge device and/or the access to the processing data of the edge device described in the security risk list.

(9) A management server (for example, a "management server 300" to be described later) communicably connected to the edge server (for example, an "edge server 100" to be described later) according to any one of (1) to (8) includes a skill information storage unit (for example, a "skill information storage unit 322" to be described later) that stores the skill information of each user; a login receiving unit (for example, a "login receiving unit 311" to be described later) that receives login information of the user via the edge server; an authentication unit (for example, an "authentication unit 312" to be described later) that performs authentication using the login information received by the login receiving unit; and a skill information transmitting unit (for example, a "skill information transmitting unit 313" to be described later) that extracts the skill information corresponding to the user from the skill information storage unit and transmits the skill information to the edge server when the user is authenticated by the authentication unit.

According to the present invention, it is possible to provide an edge server and a management server which enable a function executed by an application to be restricted according to the skill of an operator or a user in a detailed manner.

BRIEF DESCRIPTION OF THE DRAWINGS

FIG. 3 is a diagram illustrating an example of items in a list of the present embodiment.

FIG. 4 is a diagram illustrating an example of a data model of processing data of the present embodiment.

DETAILED DESCRIPTION OF THE INVENTION

Embodiment

Figure 1:
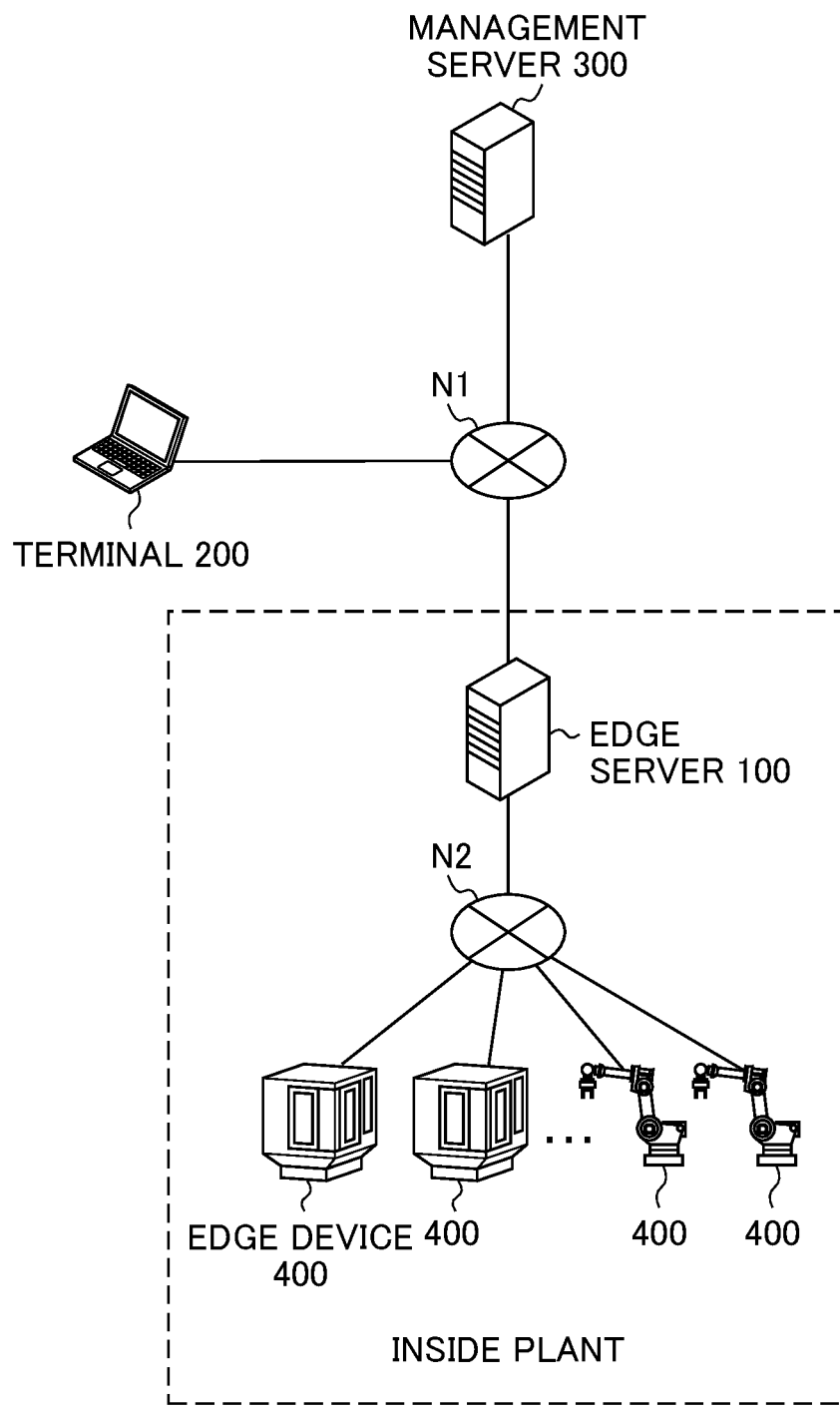
FIG. 1 is a schematic diagram illustrating a basic configuration of an application security management system according to the present embodiment.

An outline of a configuration of an application security management system 1000 (hereinafter simply referred to as an "application security management system 1000") according to the present embodiment will be described with reference to FIG. 1. FIG. 1 is a schematic diagram illustrating a basic configuration of the application security management system 1000 of the present embodiment. As illustrated in FIG. 1, the application security management system 1000 includes an edge server 100, a user terminal 200 (hereinafter simply referred to as a "terminal 200"), a management server 300, and an edge device 400.

The edge server 100, the terminal 200, and the management server 300 are connected via a network N1. The network N1 is the Internet, a virtual private network (VPN), a public telephone network, or the like, for example. A specific communication method of the network N1 and whether the network is a cable connection or a wireless connection are not particularly limited. The edge server 100 and one or more edge devices 400 are provided in a plant facility or the like of an end user, for example, and are communicably connected via a network N2 such as a local area network (LAN). The network N2 may include a network switch or the like.

The edge device 400 indicates a manufacturing apparatus including a CNC machine tool, an industrial apparatus, an industrial robot, and the like, provided in a manufacturing site such as a plant and an apparatus associated with the manufacturing apparatus such as an image sensor or a programmable logic controller (PLC) unless particularly stated otherwise. One or more edge devices 400 form a line or a cell of a plant, for example.

The edge server 100 is a server that executes an application stored in an application storage unit 121 to be described later to thereby execute a function related to one or more edge devices 400 and/or access processing data of the edge devices 400 from the edge devices 400 to perform predetermined information processing related to the application. Here, for example, the processing data of the edge device 400 indicates data indicating an operation state related to the edge device 400, data indicating a production state, data indicating a quality state of a product, and data indicating an operating state.

During execution of an application, the edge server 100 controls a use state of a function of the application related to the edge device 400 and/or an access state to the processing data of the edge device 400 on the basis of a security risk list (hereinafter also referred to as "access report list"). Specifically, an access report list related to the usability of a function of the edge device 400 and/or the accessibility to the processing data of the edge device 400, the access report list being used when an application is executed on the edge server 100, is registered in advance in the edge server 100. The application is controlled so that the predetermined information processing is performed within a range where it is reported by the access report list that the function of the edge device 400 can be used and/or the processing data of the edge device 400 can be accessed.

When a user executes a function related to the edge device 400 and/or accesses the processing data of the edge device 400 via an application, the edge server 100 performs control so that the use of the function of the edge device 400 and/or the access to the processing data of the edge device 400 is restricted according to a skill associated with the user. Specifically, a skill-information-based access control list (hereinafter also referred to as a "skill-based access list") related to the usability of the function of the edge device 400 and/or the accessibility to the processing data of the edge device 400 is registered in advance in the edge server 100 for respective skills of users. The edge server 100 is controlled so as to perform predetermined information processing within a range allowable for the skill associated with the user on the basis of the skill-based access list.

Therefore, when the user executes the function of the edge device 400 and/or accesses the processing data of the edge device 400 via an application on the edge server 100, the edge server 100 is controlled so as to perform the predetermined information processing within the range of the access report list of the application and within a range allowed by the skill-based access list according to the skill of the user.

The terminal 200 is a personal computer (PC), for example. The terminal 200 is a terminal which is communicably connected to the edge server 100 and is used by a user. For example, the user is an operator who performs operations in a plant facility including the edge server 100 and the edge device 400, an administrator who manages operators, a plant manager, or the like. Hereinafter, the user is also simply referred to as a "user". Here, the terminal 200 used by a user may be provided inside a plant facility and may be provided outside the plant facility. When a user accesses the edge server 100 via the terminal 200 and executes an application, the application can use the function related to the edge device 400 and/or access the processing data of the edge device 400 allowed by the skill-based access list on the basis of the skill information of the user.

The management server 300 is a server for managing users who use the application security management system 1000. A user who has satisfied necessary conditions (qualifications or the like) and has been assigned with a user identification (ID) for accessing the application security management system 1000 can use the application security management system 1000. The management server 300 stores login information (for example, a user ID, a password, and the like) of each user and the skill information of each user.

By doing so, the management server 300 manages sign-on (hereinafter also referred to as "login") of an application user into the edge server 100 belonging to the application security management system 1000 and login of a user into an application executed by the edge server 100 to realize single sign-on.

Figure 2:
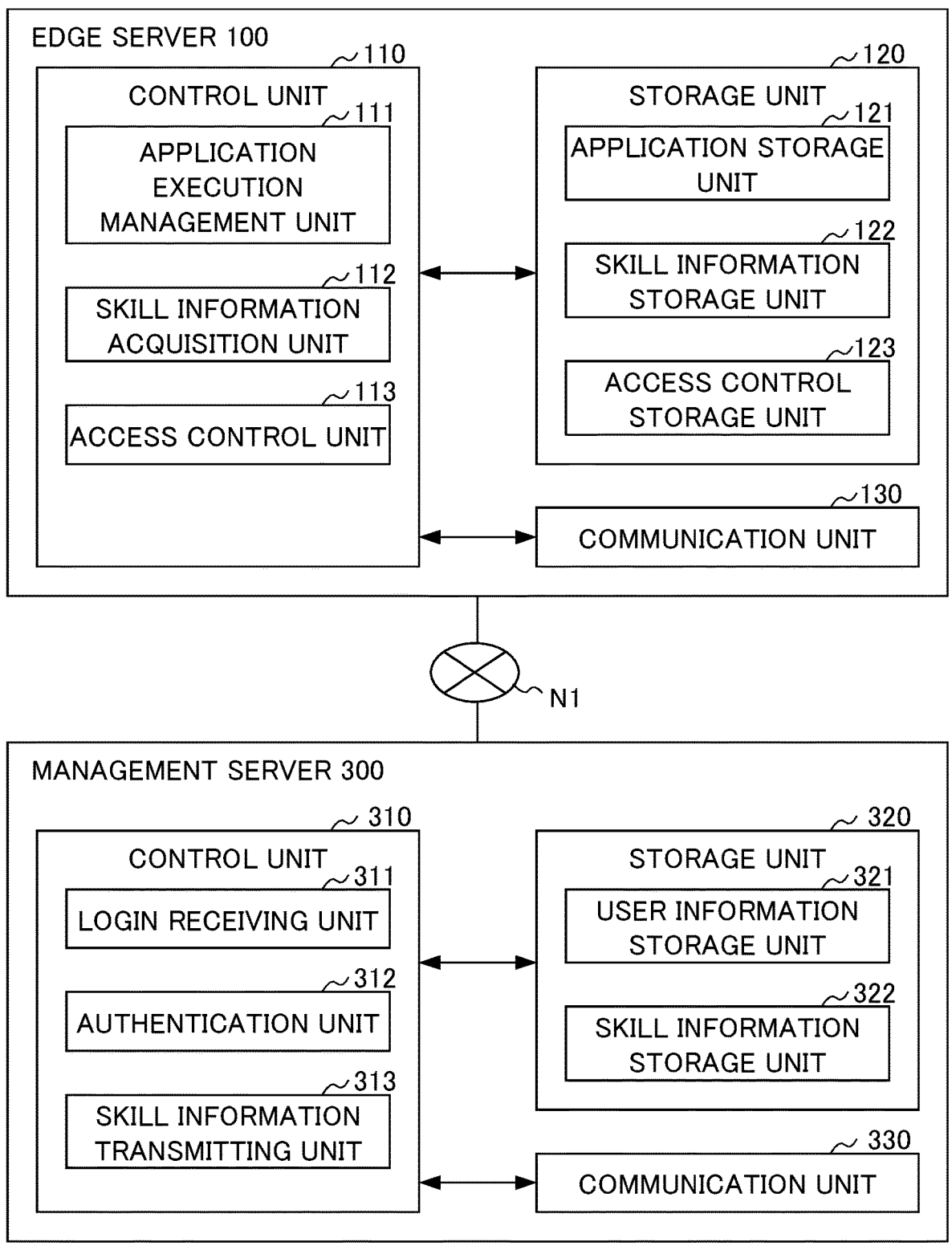
FIG. 2 is a functional block diagram of the application security management system according to the present embodiment.

Next, the functions of respective devices of the application security management system 1000 will be described. FIG. 2 is a functional block diagram of the application security management system 1000 according to the present embodiment.

<Edge Server 100>

The edge server 100 includes a control unit 110, a storage unit 120, and a communication unit 130. The control unit 110 may be a CPU and controls the edge server 100 in an integrated manner by executing various programs stored in the storage unit 120. For example, the CPU executes a program for a process (hereinafter referred to as an "application execution management process") of receiving and executing execution of an application from the terminal 200 of a user. Moreover, the CPU executes a program for a process (hereinafter referred to as a "skill information acquisition process") of acquiring the skill information of a user. Furthermore, the CPU executes a program for a process (hereinafter referred to as an "access control process") of determining the presence of access to an application in execution and controlling the access. In this manner, by executing the programs for the application execution management process, the skill information acquisition process, and the access control process, an application execution management unit 111, a skill information acquisition unit 112, and an access control unit 113 are formed in the CPU as a functional configuration.

Prior to description of the respective functional units of the control unit 110, the storage unit 120 will be described first. The storage unit 120 includes an application storage unit 121, a skill information storage unit 122, and an access control storage unit 123 in addition to the programs executed by the control unit 110. The application storage unit 121 is a storage area that stores applications executed on the edge server 100. The application is an application developed by an application developer, for example, and is purchased from a sales management site (not illustrated) or the like and is downloaded to the edge server 100. The skill information storage unit 122 is a temporary storage area that stores the skill information of a user who uses an application executed on the edge server 100. The skill information of the user is acquired from the management server 300 or the like, for example, when the user logs into the edge server 100 or executes an application after logging-in and is (temporarily) stored until the user logs out.

Examples of the skill information include information on qualifications of a user, information on a group to which the user belongs, information on the edge device 400 that the user can operate, information on the content of an operation that the user can perform, and information on the user's completion of a training course for a technique related to the edge device 400. The information on the qualifications of the user is information of qualifications required for handling the edge device depending on the type of the edge device 400 and is information indicating the role or the operation right of an operator such as an administrator of a manufacturing system, a general operator, a system integrator, a maintenance operator, or a privileged administrator, for example. The information on the group to which the user belongs is information on a section to which an operator belongs such as a first machining section or a welding quality section and is information on a place such as a line or a station of a plant in which the edge device 400 is installed, such as line L1 maintenance, line L2 maintenance, or line L3 maintenance, for example. The information on the edge device 400 that the user can operate is information that limits the edge device 400 that the user can handle, for example. The information may be the type of the edge device 400 that the user can handle and may be a manufacturer of an edge device that the user can handle. Moreover, the information may be the version of hardware of the edge device 400 that the user can handle. The information on the content of an operation that the user can perform is information indicating the operability of a user on detailed operations such as various setting operations of the edge device 400, start-up, and disposal, for example. The information on the user's completion of a training course for a technique related to the edge device 400 is information on the user's completion of an education related to handling of the edge device 400, for example, and is the completion of an education related to maintenance of a CNC machine tool or the completion of an education related to teaching of an industrial robot. The skill information of the user is a code with which a computer can analyze the above-described information.

The access control storage unit 123 is a storage area that stores the access report list and the skill-based access list. As described above, the access report list registered for each application is a list in which the usability of a function of the edge device 400 and/or the accessibility to the processing data of the edge device is registered, the list being used by an application when the application is executed on the edge server 100. In contrast, the skill-based access list is a list in which the usability of the function of the edge device 400 that is connectable to the edge server 100 and/or the accessibility to the processing data of the edge device 400 is registered for each skill.

FIG. 3 illustrates an example of the access report list and the skill-based access list. A "manufacturing apparatus" illustrated in FIG. 3 corresponds to the edge device 400, and actually, a CNC machine tool, an industrial apparatus, an industrial robot, and the like are designated. In the list item, a check mark is filled in a checkbox corresponding to an accessible manufacturing apparatus, for example. The access report list is registered for respective applications whereas the skill-based access list is registered for respective classified skills. The list item 620 illustrated in FIG. 3 illustrates examples of common items of both the access report list and the skill-based access list. The skill-based access list has a list of contents illustrated in the list item 620 for each piece of skill information. The access report list has a list of contents illustrated in the list item 620 for each application. The skill-based access list and the access report list are codes with which a computer can analyze the contents illustrated in FIG. 3.

More specifically, examples of the processing data of the edge device 400 include data indicating the operating state related to the edge device 400, data indicating a production state, data indicating the quality state of a product, and data indicating an event (history) of an operating state or the like. These pieces of processing data are data-modeled (that is, standardized) in advance, and accessibility is set on the basis of a data model standardized in this manner. With such a scheme, it is possible to provide a standardized interface for accessing the processing data related to the edge device 400.

FIG. 4 illustrates an example of a data model 630 of the processing data of a CNC machine tool. As illustrated in the data model 630, the processing data can be classified into respective categories of operating state information, production state information, quality maintenance information, various pieces of event (history) information, and archives. Each category includes common data and part data. The common data is data common to a CNC machine tool and the part data is data related to respective parts that form a CNC machine tool such as a shaft and a motor of the CNC, machine tool. Although not illustrated in the drawings, similarly to the processing data, the function of the edge device 400 includes a function related to the operating state, a function related to the production state, a function related to the quality maintenance, a function related to various events (history), and a function related to archives. Similarly, to the data model, the function provided by the edge device 400 may be modeled. Thus, it is possible to provide a standardized interface for using the function provided by the edge device 400.

Next, respective functional units of the control unit 110 will be described. The application execution management unit 111 executes an application stored in the application storage unit 121 on the basis of an application activation request. The application execution management unit 111 manages execution of applications. The skill information acquisition unit 112 acquires the skill information of a user from the management server 300 or the like when the user logs into the edge server 100 or executes an application after logging-in and stores the skill information (temporarily) in the skill information storage unit 122 until the user logs out.

The access control unit 113 determines whether the user has an access right to use the function of the edge device 400 and/or the right to access the processing data of the edge device 400 on the basis of the skill information of the user and the skill based access list stored in the access control storage unit 123 when the user requests the use of the function of the edge device 400 and/or the access to the processing data of the edge device 400 via an application executed on the edge server 100. The access control unit 113 allows the use of the function of the edge device 400 and/or the application's access to the processing data of the edge device 400 for which it is determined that the user has an access right.

As described above, the access control unit 113 allows the use of the function related to the edge device 400 and/or the access to the processing data of the edge device 400, illustrated in the access report list related to the usability of the function of the edge device 400 and/or the accessibility to the processing data of the edge device 400, the access report list being used when the application is executed on the edge server 100. Therefore, even when the use of a function related to the edge device 100 and/or the access to the processing data of the edge device 400 is allowed in the skill-based access list in correspondence to the skill information of the user, if the use and/or the access is not allowed in the access report list of the application, the access control unit 113 does not allow the user of the function related to the edge device 400 and/or the access to the processing data of the edge device 400.

In this manner, the access control unit 113 controls the application's use of the function of the edge device 400 and/or the access to the processing data of the edge device 400 on the basis of the content of the access report list correlated with the application executed by the application execution management unit 111 and the skill-based access list corresponding to the skill of the user. Specifically, the access control unit 113 performs control so that the user is allowed to use the function related to the edge device 400 and/or access the processing data of the edge device 400 illustrated in the skill-based access list corresponding to the skill information of the user only among the functions related to the edge devices 400 and/or the processing data of the edge device 400 illustrated in the access report list.

Upon detecting the use of the function of the edge device 400 and/or the application's access request for the processing data of the edge device 400 for which the user does not have an access right, the access control unit 113 may display a alarm message to stop the user using an application.

Although not illustrated in FIG. 2, the edge server 100 preferably include a management agent 150 (see FIG. 5) which is an agent of the management server 300. The management agent 150 is installed in the edge server 100 and provides an interface with the management server 300 to a functional unit in the terminal 200 or the edge server 100, for example. The function of the agent is well known to those skilled in the art and the detailed description will be omitted.

The communication unit 130 is a communication control device that transmits and receives data to and from an external device (for example, the management server 300 and the like) via the network N1 and transmits and receives data to and from an external device (for example, the edge device 400) via the network N2.

<Management Server 300>

The management server 300 includes a control unit 310, a storage unit 320, and a communication unit 330. The control unit 310 may be a CPU and controls the management server 300 in an integrated manner by executing various programs stored in the storage unit 320. For example, the CPU executes a program for a process (hereinafter referred to as a "login receiving process") of receiving login information from the terminal 200 of a user. Moreover, the CPU executes a program for a process (hereinafter referred to as an "authentication process") of authenticating a user on the basis of login information. Furthermore, the CPU executes a program for a process (hereinafter referred to as a "skill information transmitting process") of transmitting the skill information of a user when the user is authenticated. In this manner, by executing the programs for the login receiving process, the authentication process, and the skill information transmitting process, a login receiving unit 311, an authentication unit 312, and a skill information transmitting unit 313 are formed in the CPU as a functional configuration.

Prior to description of the respective functional units of the control unit 310, the storage unit 320 will be described first. The storage unit 320 includes a user information storage unit 321 and a skill information storage unit 322 in addition to the programs executed by the control unit 310. The user information storage unit 321 is a storage area that stores login information, affiliation information, and the like of users who can use the application security management system 1000. The login information of a user is a user name, a login ID, a password, and the like, for example. The affiliation information of a user is a section name to which the user belongs, a location, and the like, for example. The user data stored in the user information storage unit 321 is registered, for example, by a plant manager or the like before the user starts using the application security management system 1000. The skill information storage unit 322 is a storage area that stores the skill information of respective users.

Next, functional units of the control unit 310 will be described. The login receiving unit 311 receives login information from a user via the management agent 150 installed in the edge server 100, for example, when the user accesses the edge server 100 via the terminal 200 and the user is not authenticated. The authentication unit 312 authenticates the user by referring to the user information storage unit 321 on the basis of the login information of the user received by the login receiving unit 311. When the user is authenticated by the authentication unit 312, the skill information transmitting unit 313 extracts the skill information of the user from the skill information storage unit 322 and transmits the skill information to the edge server 100. When the management agent 150 managing logged-in users is installed in the edge server 100, the skill information transmitting unit 313 transmits the skill information of the user to the edge server 100 upon receiving a skill information transmission request from the management agent 150 of the edge server 100. The communication unit 330 is a communication control device that transmits and receives data to and from an external device (for example, the terminal 200, the edge server 100, and the like) via the network N1.

Figure 5:
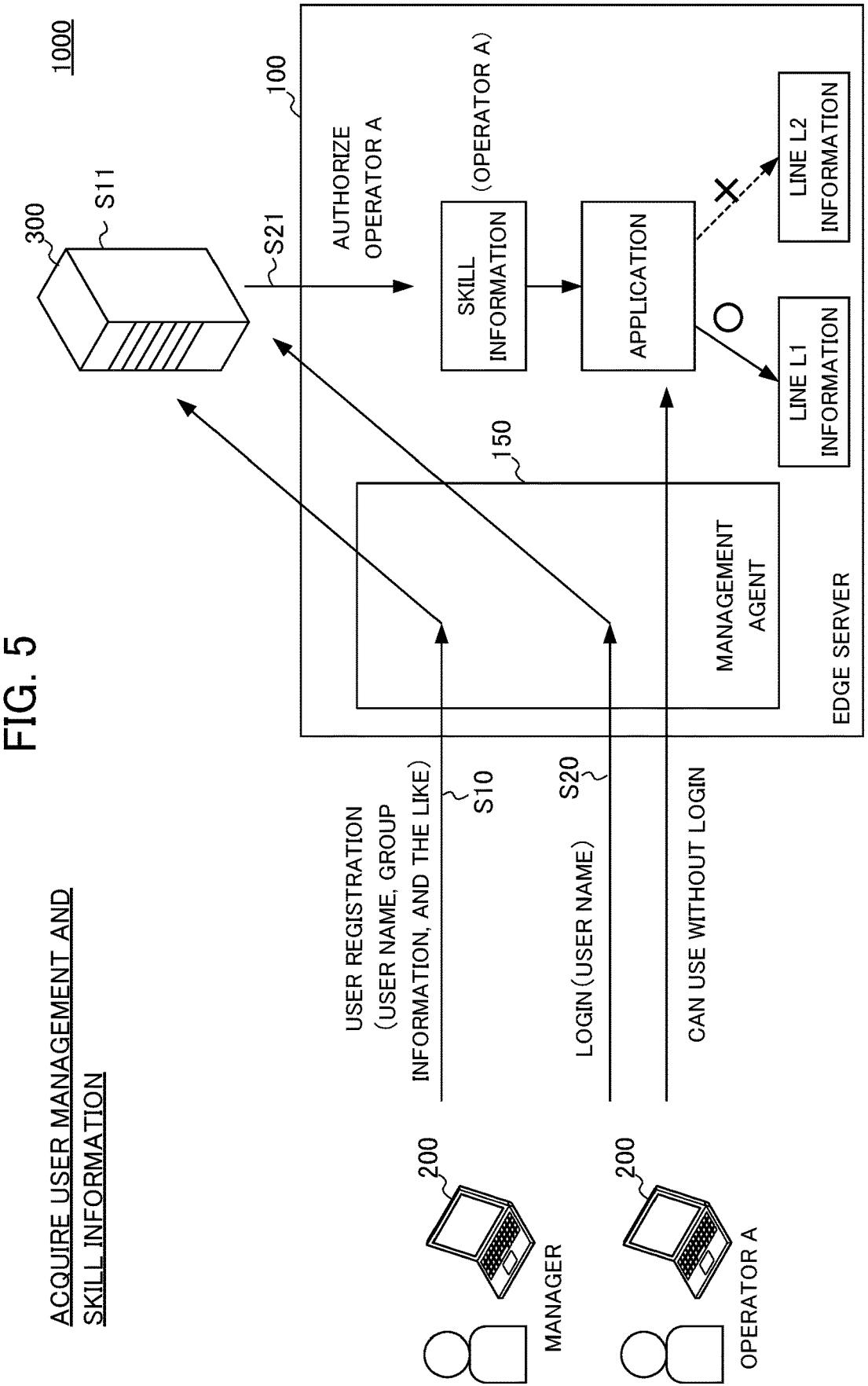
FIG. 5 is a diagram for describing a process of acquiring user management and skill information in the application security management system of the present embodiment.

Here, a process of acquiring user management and skill information will be described with reference to FIG. 5. It is assumed that the management agent 150 which is an agent of the management server 300 is installed in the edge server 100. FIG. 5 is a diagram for describing a process of acquiring user management and skill information, performed by the application security management system 1000 of the present embodiment. As a premise, an administrator such as a plant manager has a right to access the management server 300 and update data.

First, in step S10 (hereinafter step S will be referred to simply as "S"), a plant manager or the like registers users who are allowed to use the application security management system 1000 from the terminal 200 to the management server 300. The plant manager registers group information such as a user name and an affiliation of an operator of a plant to which the plant manager belongs and the skill information of a user according to a predetermined form, for example. In S11, the control unit 310 of the management server 300 stores the group information such as the user name and the affiliation of the user in the user information storage unit 321 on the basis of the received information. The management server 300 stores the skill information of the user input from the plant manager or the like and/or acquired from another skill management server (not illustrated) in the skill information storage unit 322, for example. In this way, the user can log into the application security management system 1000.

Subsequently, in S20, an operator A whose login information or the like is registered in the user information storage unit 321 of the management server 300 logs into the edge server 100 using the terminal 200. In this case, although the operator A performs the first login by inputting login information and a password, when the operator A accesses another edge server 100 or the like of the application security management system 1000 after the first login, the operator A does not need to perform another login since the login information is transferred to the management agent 150.

In S21, the management server 300 having received the login information authenticates the operator A, and when authorized, transmits the skill information of the operator A to the edge server 100. Since the management agent 150 manages the skill information of the operator A, when the operator A tries to access another edge server 100 of the application security management system 1000, the edge server 100 may cause the management agent 150 to transmit the skill information to the other edge server 100. When the management agent 150 does not manage the skill information of the operator A and the operator A tries to access another edge server 100 of the application security management system 1000, the management server 300 may transmit the skill information to the other edge server 100.

With such a user management scheme, when a user performs first login to use the application security management system 1000, since the user does not need to perform login again and the login information is transferred to the other edge server 100 or an application, the user does not need to perform complex operations and the user's burden can be reduced. Moreover, the user skill information stored in the management server 300 can be transmitted to a necessary edge server 100.

When a user executes an application, the user can use the function of the edge device 400 and/or access the processing data of the edge device 400, which is allowed for the skill of the skill-based access list on the basis of the skill information of the user. In this manner, it is possible to restrict the user's use of the function related to the edge device 400 and/or the access to the processing data of the edge device 400.

Hereinabove, the functional blocks included in the edge server 100 and the management server 300 have been described. The respective devices included in the application security management system 1000 can be realized by hardware, software, or a combination thereof. Here, a device being realized by software means that a computer reads and executes a program (an application) whereby the device is realized. As a specific example, the edge server 100 and the management server 300 can be realized by incorporating a program (an application) for realizing the present embodiment in an ordinary server.

Figure 6:
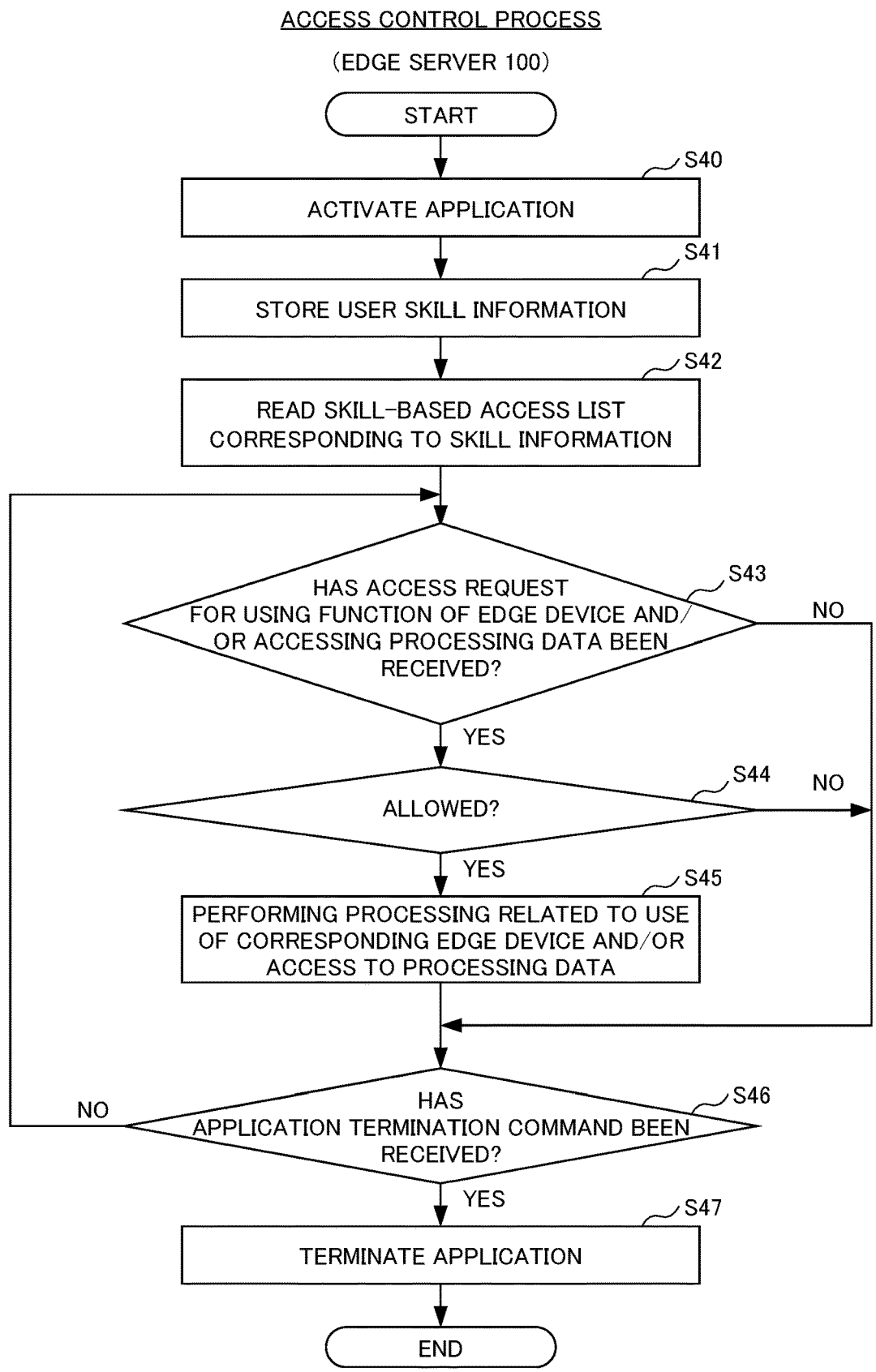
FIG. 6 is a flowchart illustrating an access control process in an edge server according to the present embodiment.

Next, a process flow related to the edge server 100 controlling applications using the skill-based access list will be described with reference to FIGS. 6 and 7. FIG. 6 is a flowchart illustrating an access control process performed by the edge server 100 of the present embodiment. In the process flow of FIG. 6, a step of determining an access request is a request for the use of a function related to the edge device 400 and/or the access to the processing data of the edge device 400 illustrated in the access report list is omitted.

In S40 of FIG. 6, the application execution management unit 111 of the edge server 100 activates an application stored in the application storage unit 121 in response to an application activation request from a user. In S41, the skill information acquisition unit 112 acquires the skill information of the user who activated the application from the management server 300 or the like and (temporarily) stores the skill information in the skill information storage unit 122 until the user logs out. In S42, the access control unit 113 reads the skill-based access list corresponding to the read skill information of the user from the access control storage unit 123.

In S43, the access control unit 113 determines whether a request for the use of the function of the edge device 400 and/or the access to the processing data of the edge device 400 is received from the application. When the request is received (S43: YES), the access control unit 113 proceeds to S44. When the request is not received (S43: NO), the access control unit 113 proceeds to S46.

In S44, the access control unit 113 determines on the basis of the skill-based access list whether the use of the function of the edge device 400 and/or the access to the processing data of the edge device 400 corresponding to the request is allowed. When the access is allowed (S44: YES), the access control unit 113 proceeds to S45. On the other hand, when the access is not allowed (S44: NO), the access control unit 113 proceeds to S46. That is, when the access is not allowed for the skill, the access control unit 113 outputs a alarm message to the terminal 200, for example, and does not perform execution of the function of the edge device 400 and/or the access to the processing data of the edge device 400 requested from the user. In S45, the access control unit 113 performs a process of executing the function of the edge device 400 and/or accessing the processing data of the edge device 400 requested from the user.

In S46, the control unit 110 determines whether an application termination command is received. The control unit 110 determines that an application termination command is received when an operation of turning off the edge server 100 is received or an operation of forcibly terminating the application is received, for example, in addition to when the application termination command is received from the user. When the application termination command is received (S46: YES), the control unit 110 proceeds to S47 and terminates the application. On the other hand, when the application termination command is not received (S46: NO), the access control unit 113 proceeds to S43.

Figure 7:
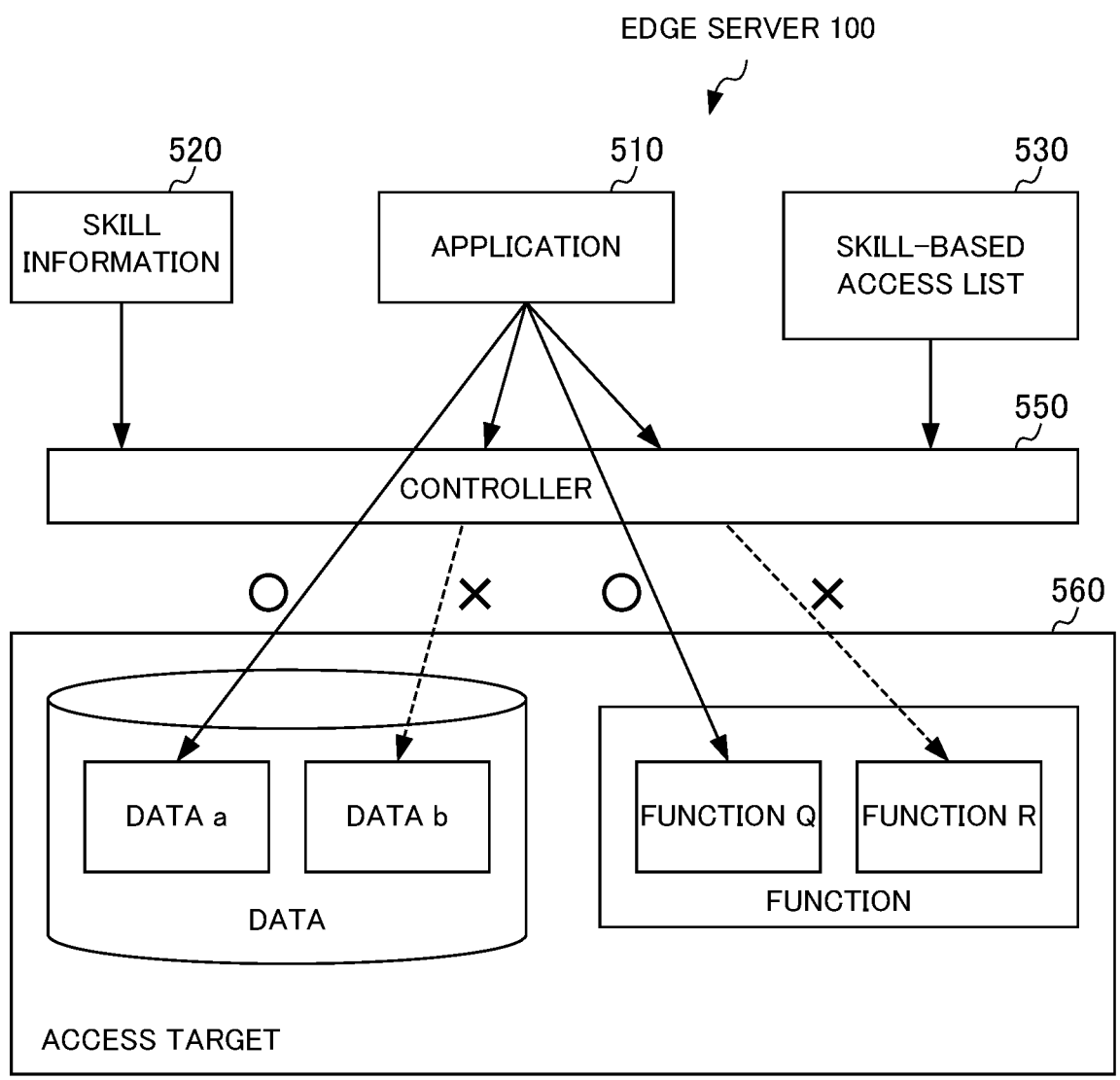
FIG. 7 is a diagram illustrating an example of an access control process in the edge server according to the present embodiment.

FIG. 7 is a diagram illustrating an example of an access control process performed by the edge server 100 of the present embodiment. In the example illustrated in FIG. 7, a controller 550 that controls an application 510 reads the skill information 520 of the user and the skill-based access list 530 corresponding to the skill information 520. As illustrated in FIG. 7, the edge server 100 has data a and b and functions Q and R as an access target 560. Here, it is assumed that access to the function Q and the data a is allowed whereas access to the function R and the data b is not allowed. In this case, as illustrated in FIG. 7, when the request received from the application 510 is an access request for the data a, the access control unit 113 allows the application 510 to access the data a by referring to the skill-based access list 530 corresponding to the skill information 520 of the user since the access is allowed. When the request received from the application 510 is an access request for the function R, the access control unit 113 does not allow the application 510 to execute the function R by referring to the skill-based access list 530 corresponding to the skill information 520 of the user since the access is not allowed. In this way, the access control unit 113 performs access control related to an arbitrary application according to the skill information of an operator.

Figure 8A:
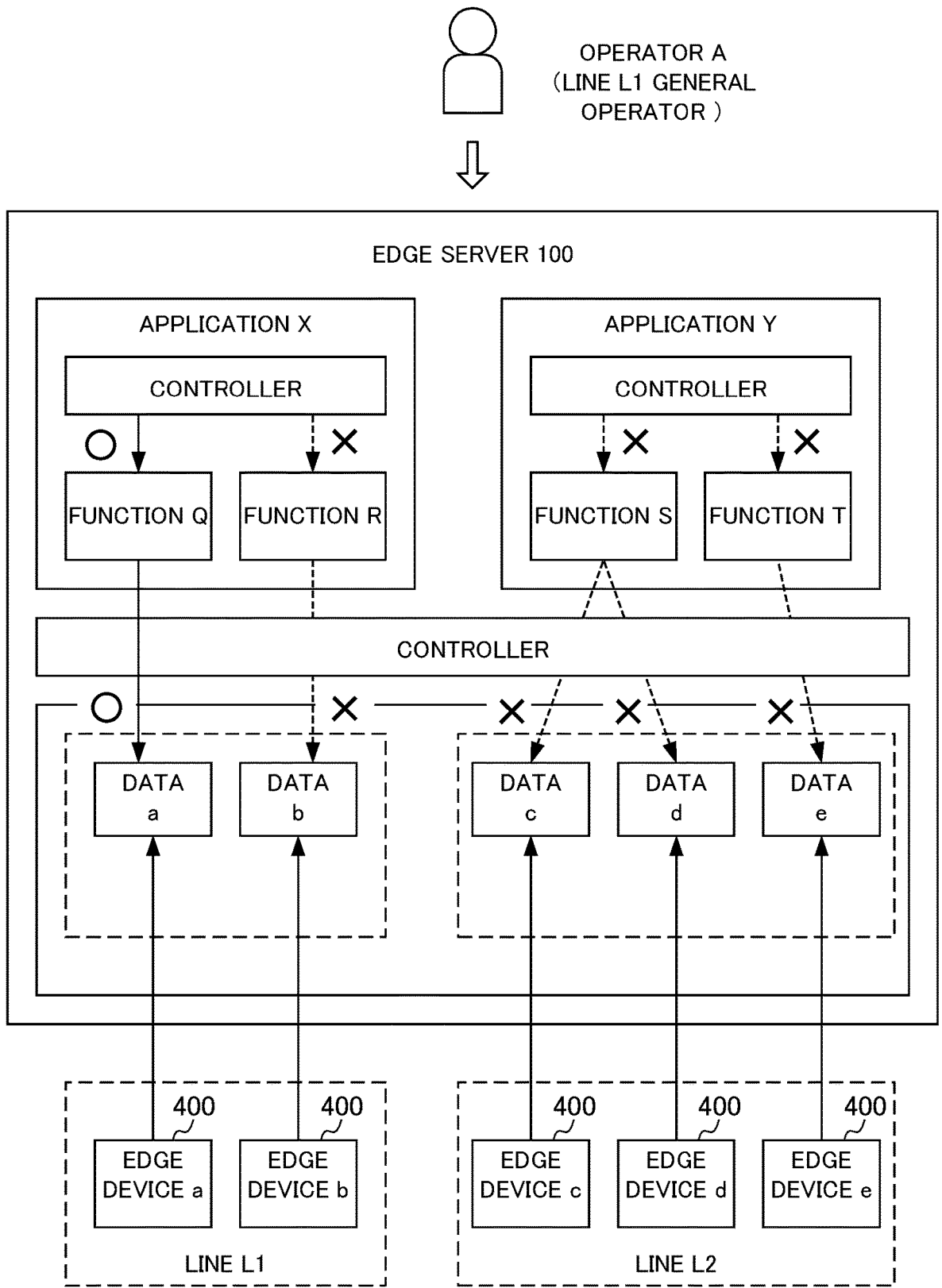
FIG. 8A is a diagram for describing a specific example of operator-based access in the edge server according to the present embodiment.
Figure 8B:
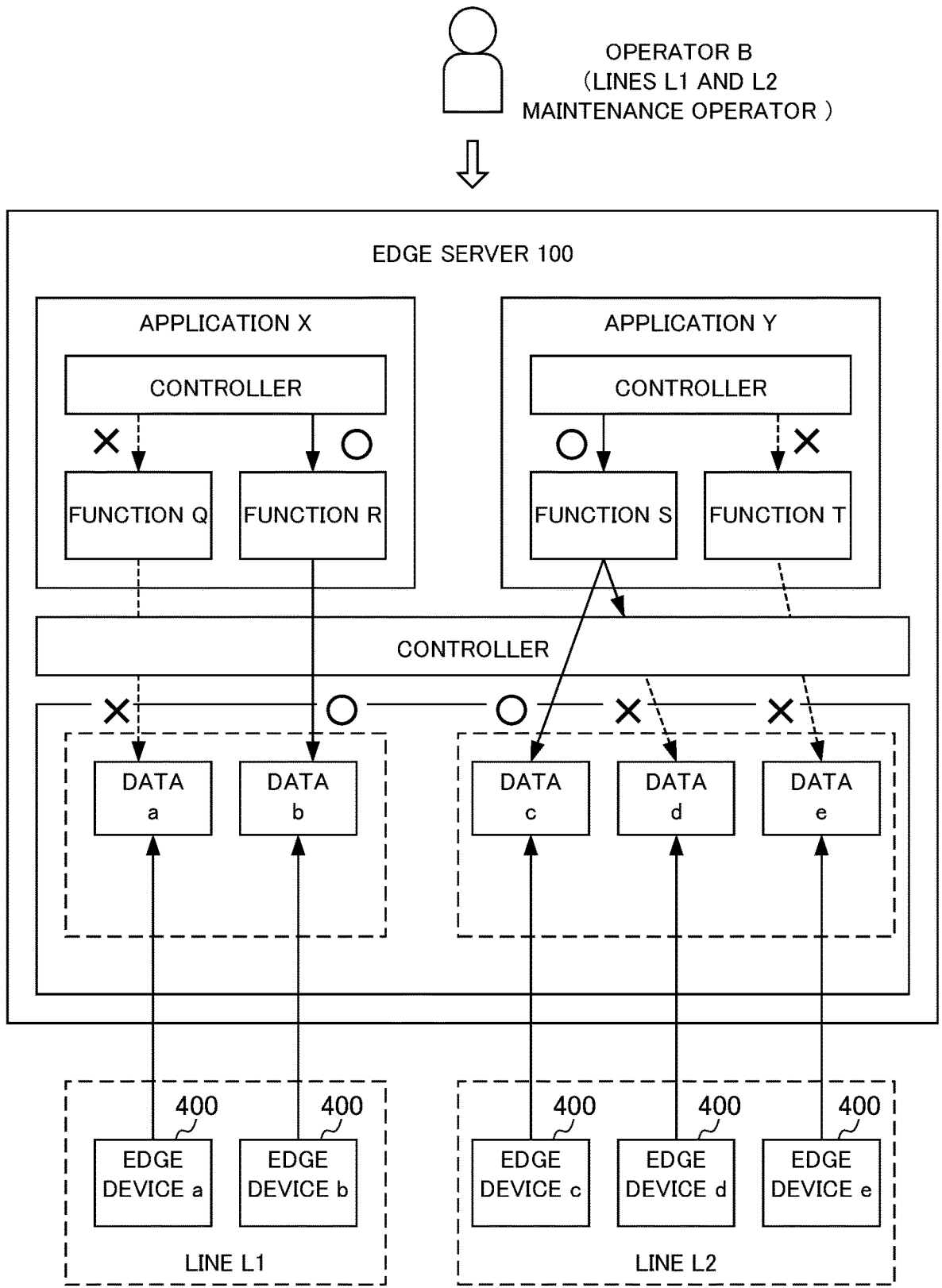
FIG. 8B is a diagram for describing a specific example of operator-based access in the edge server according to the present embodiment.

Next, a specific example of the access of an application depending on the skill information of an operator will be described. FIGS. 8A and 8B are diagrams for describing a specific example of operator-based access in the edge server 100 of the present embodiment. FIG. BA illustrates an example of a case in which an operator A who is a general operator of a line L1 executes an application. As a premise, the edge server 100 stores applications X and Y and can execute the applications. Application X executes functions Q and R that use data a and b of line L1. Moreover, the application Y executes functions S and T that use data c to e of a line L2. Since the operator A is responsible for the line L1, the skill information of the operator A has information on at least the line L1. On the basis of the skill information of the operator A, the edge server 100 allows execution of the function Q only that a general operator can perform, for example, according to the skill-based access list. Therefore, when the operator A executes the application X, the edge server 100 can perform the function only. Even if the operator A executes the application Y, since the edge server 100 is not allowed for all functions, any processing is not performed.

On the other hand, FIG. 8B illustrates an example of a case in which an operator B who is a maintenance operator of lines L1 and 12 executes an application. Since the operator B is responsible for the lines L1 and L2, the skill information of the operator B has information on at least the lines L1 and L2. On the basis of the skill information of the operator B, the edge server 100 allows execution of the functions R and S that can be used in a maintenance operation, for example, according to the skill-based access list. However, the edge server 100 does not allow execution of functions Q and T which are not used in a maintenance operation. On the basis of the skill information of the operator B, the edge server 100 allows access to the processing data of an edge device c on which the operator B can perform a maintenance operation, for example, according to the skill-based access list within the function S that can be used in the maintenance operation. However, the edge server 100 does not allow access to the processing data of an edge device d on which the operator B cannot perform a maintenance operation.

[Modification]

The above-described example relates to access control of applications using the skill information and the skill-based access list while omitting the determination on whether the access request from the user with respect to applications is a request for the user of the function related to the edge device 400 and/or the access to the processing data of the edge device 400 illustrated in the access report list in this modification, a case of determining whether the access request from the user with respect to applications is a request for the user of the function related to the edge device 400 and/or the access to the processing data of the edge device 400 illustrated in the access report list will be described briefly.

In this case, in the process flow illustrated in FIG. 6, a step of determining whether the access request from the user with respect to applications is a request for the user of the function related to the edge device 400 and/or the access to the processing data of the edge device 400 illustrated in the access report list may be inserted between S43 and S44. Therefore, the access control unit 113 can perform control so that the request for the use of the function related to the edge device 400 and/or the access to the processing data of the edge device 400 illustrated in the access report list of the application and the request for the use of the function related to the edge device 400 and/or the access to the processing data of the edge device 400 illustrated in the skill-based access list corresponding to the skill information of the user are allowed for the request for the use of the function related to the edge device 400 and/or the access to the processing data of the edge device 400 via the application from the user.

Figure 9:
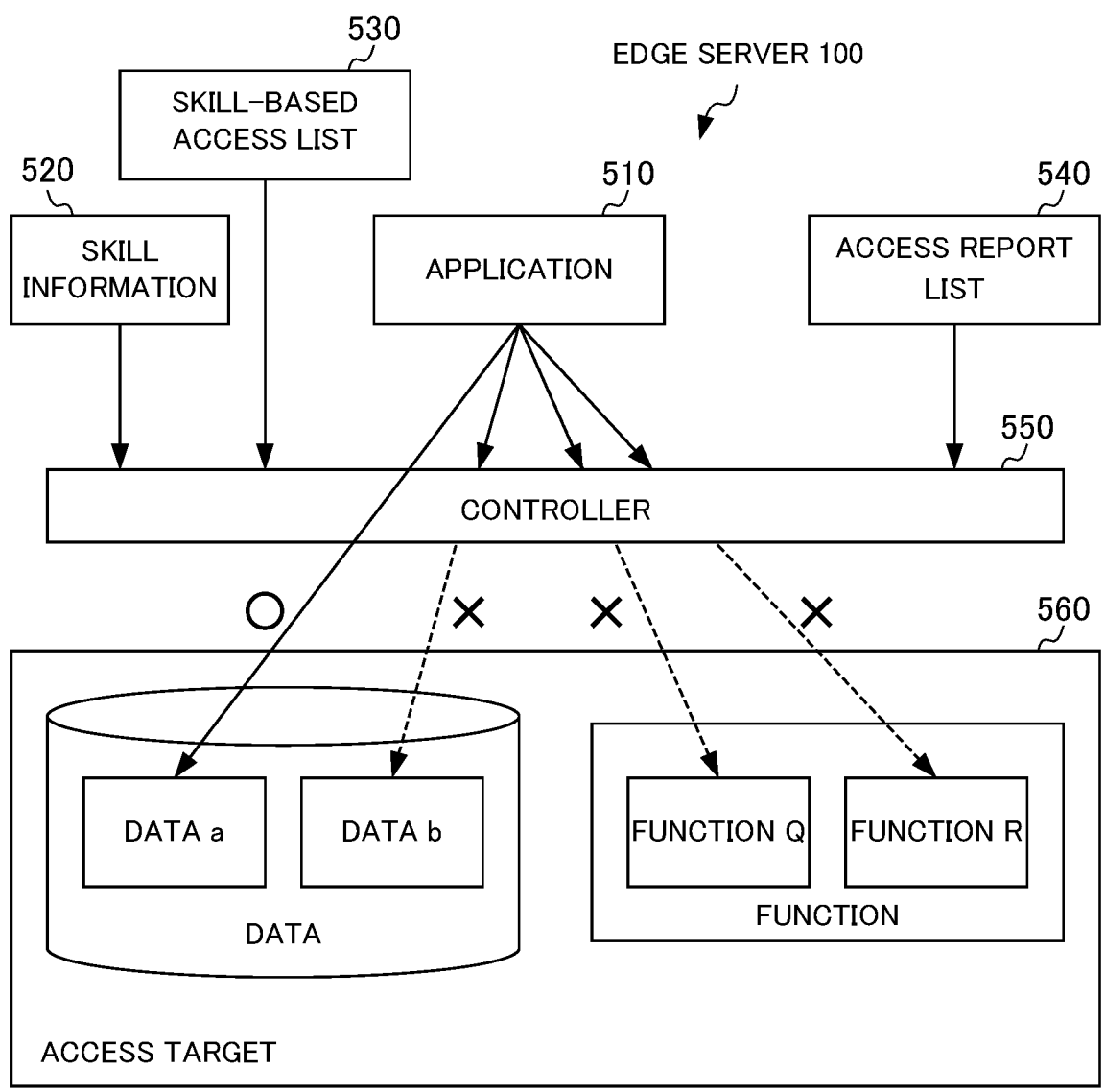
FIG. 9 is a diagram illustrating an example of an access control process in an edge server according to a modification of the present embodiment.

FIG. 9 is a diagram illustrating an example of the access control process performed by the edge server 100. In FIG. 9, the accessibility registered in the access report list 540 corresponding to the application is further added to those illustrated in FIG. 7. Referring to FIG. 9, when the use of function Q is not, allowed in the access report list 540, access to the function Q is not allowed unlike FIG. 7.

With this configuration, since the application security management system 1000 monitors the accesses of an executed application to the function of the edge device 400 and/or the processing data of the edge device 400 on the basis of the user's skill information and the skill-based access list, it is possible to obtain a structure that allows the access matching the user's skill and to further improve the security. Since the skill information has information on various skills, it is possible to restrict functions in a more detailed manner so as to match the user's skill.

The programs as well as the applications used in the present invention may be stored using various types of non-transitory computer readable media and be supplied to a computer. The non-transitory computer readable media include various types of tangible storage media. Examples of the non-transitory computer readable media include a magnetic recording medium (for example, a flexible disk, magnetic tape, or a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, or a random access memory (RAM). Moreover, the programs may be supplied to a computer in a form of various types of transitory computer readable media. Examples of transitory computer readable media include electrical signals, optical signals, and electromagnetic waves. The transitory computer readable media can supply programs to a computer via a wired communication path such as an electric wire and an optical fiber or a wireless communication path.

The above-described embodiment is a preferred embodiment of the present invention. However, the scope of the present invention is not limited to the embodiment only but the present invention can be embodied in various modifications without departing from the spirit of the present invention.

(Modification 1)

In the above-described embodiment, examples of the list item of the skill-based access list and the access report list are illustrated in FIG. 3. However, the list item is not limited thereto. Although examples of the data model are illustrated in FIG. 4, the data model is not limited thereto. A data model similar to that of FIG. 4 may be applied to various manufacturing apparatuses excluding the CNC machine tool.

(Modification 2)

In the above-described embodiment, the user-based access control for the use of the function of the edge device 400 and/or the access to the processing data of the edge device 400 on the basis of the skill information and the skill-based access list has been described. However, the access control is not limited thereto. The use of the function of the edge device 400 and the processing data of the edge device 400 is preferably subdivided in a more detailed manner as illustrated in the list item and the data model. Access control may be performed on the basis of a combination of time information and the skill information. For example, if an access date is not maintenance dates, a maintenance operator is not allowed to use the function of the edge device 400 and/or to access the processing data of the edge device 400. This process can be performed by regarding the skill information acquired from the management server 300 as being different depending on a login date.

(Modification 3)

In the above-described embodiment, an example in which the controller 550 performs access control in the edge server 100 has been described. However, the subject of the access control is not limited thereto. The skill-based access list and the access report list may be configured as program elements of an application so that the request for the use of the function of the edge device 400 and/or the access to the processing data of the edge device 400 is processed on the basis of the skill-based access list and the access report list in a programmed manner. However, in this case, processing of the request may preferably be confirmed by the access control unit 113.

EXPLANATION OF REFERENCE NUMERALS

100: Edge server
110, 310: Control unit
111: Application execution management unit
112: Skill information acquisition unit
113: Access control unit
120, 320: Storage unit
121: Application storage unit
122: Skill information storage unit
123: Access control storage unit
200: Terminal
300: Management server
311: Login receiving unit.
312: Authentication unit
313: Skill information transmitting unit
321: User information storage unit
322: Skill information storage unit
400: Edge device
1000: Application security management system

What is claimed is:

1. An edge server communicably connected to one or more edge devices, the edge server comprising:
    a processor; and
    a non-transitory memory having stored thereon executable instructions, which when executed, cause the processor to perform:
        managing execution of an application that uses a function of the edge device and/or accesses processing data of the edge device, the application being operated by the edge server;
        storing the application;
        storing a predetermined skill-information-based access control list related to usability of the function of the edge device and/or accessibility to the processing data of the edge device;
        acquiring skill information of a user who is authorized to log into a system including the edge server;
        determining whether the user has a right related to using the function of the edge device and/or accessing the processing data of the edge device on the basis of the skill information of the user and the skill-information-based access control list when the user issues a request for the use of the function of the edge device and/or the access to the processing data of the edge device via the application; and
        allowing the user to use the function of the edge device and/or access the processing data of the edge device via the application when it is determined that the user has the right,
    wherein the skill-information-based access control list includes for each piece of skill information:
        usability information of each function related to an operating state of the edge device and/or accessibility information of each piece of processing data;
        usability information of each function related to a production state of the edge device and/or accessibility information of each piece of processing data;
        usability information of each function related to quality maintenance of the edge device and/or accessibility information of each piece of processing data;
        usability information of each function related to an event of the edge device and/or accessibility information of each piece of processing data; and
        usability information of each function related to an archive of the edge device and/or accessibility information of each piece of processing data.

2. The edge server according to claim 1, wherein the skill-information-based access control list includes accessibility information on accessibility to a type and/or an installation group of the edge device for each piece of skill information.

3. The edge server according to claim 1, wherein the processor acquires the skill information of the user from a management server that manages users of a system including the edge server.

4. The edge server according to claim 3, wherein the processor acquires the skill information of the user from a management agent, which is an agent of the management server.

5. The edge server according to claim 1, wherein the skill information further includes at least one of information on qualification of each user, information on a group to which the user belongs, information on the edge device that the user can operate, information on a content of an operation that the user can perform, and information on user's completion of a training course.

6. An edge server communicably connected to one or more edge devices, the edge server comprising:
    a processor; and
    a non-transitory memory having stored thereon executable instructions, which when executed, cause the processor to perform:
        managing execution of an application that uses a function of the edge device and/or accesses processing data of the edge device, the application being operated by the edge server;

storing the application;
storing a predetermined skill-information-based access control list related to usability of the function of the edge device and/or accessibility to the processing data of the edge device;
acquiring skill information of a user who is authorized to log into a system including the edge server;
determining whether the user has a right related to using the function of the edge device and/or accessing the processing data of the edge device on the basis of the skill information of the user and the skill-information-based access control list when the user issues a request for the use of the function of the edge device and/or the access to the processing data of the edge device via the application; and
allowing the user to use the function of the edge device and/or access the processing data of the edge device via the application when it is determined that the user has the right,
wherein the processor stores the application and a security risk list related to the application's usability of the function of the edge device and/or the application's accessibility to the processing data of the edge device, and
wherein the processor monitors a request for the application's use of the function of the edge device and/or the application's access to the processing data of the edge device on the basis of a content of the security risk list and allows the request for the use of the function related to the edge device and/or the access to the processing data of the edge device described in the security risk list.

7. An application security management system comprising:
an edge server communicably connected to one or more edge devices; and
a management server communicably connected to the edge server,
wherein the edge server comprises a first processor and first a non-transitory memory having stored thereon first executable instructions, which when executed, cause the first processor to perform:
managing execution of an application that uses a function of the edge device and/or accesses processing data of the edge device, the application being operated by the edge server;
storing the application;
storing a predetermined skill-information-based access control list related to usability of the function of the edge device and/or accessibility to the processing data of the edge device;
acquiring skill information of a user who is authorized to log into a system including the edge server;
determining whether the user has a right related to using the function of the edge device and/or accessing the processing data of the edge device on the basis of the skill information of the user and the skill-information-based access control list when the user issues a request for the use of the function of the edge device and/or the access to the processing data of the edge device via the application; and
allowing the user to use the function of the edge device and/or access the processing data of the edge device via the application when it is determined that the user has the right,
wherein, when the user is not authorized to log into the system including the edge server, the edge server transmits login information of the user to the management server,
wherein the management server comprises a second processor and second a non-transitory memory having stored thereon second executable instructions, which when executed, cause the second processor to perform:
storing the skill information of each user;
receiving the login information of the user from the edge server;
performing authentication using the login information of the user; and
extracting the skill information corresponding to the user from the skill information of the user, and transmitting the skill information to the edge server when the user is authenticated using the login information of the user, and
wherein the edge server acquires the skill information from the management server as skill information of the user who is authorized to log into the system.

8. The edge server according to claim 6, wherein
the skill-information-based access control list includes accessibility information on accessibility to a type and/or an installation group of the edge device for each piece of skill information.

9. The edge server according to claim 6, wherein
the processor acquires the skill information of the user from a management server that manages users of a system including the edge server.

10. The edge server according to claim 9, wherein
the processor acquires the skill information of the user from a management agent, which is an agent of the management server.

11. The edge server according to claim 6, wherein
the skill information further includes at least one of information on qualification of each user, information on a group to which the user belongs, information on the edge device that the user can operate, information on a content of an operation that the user can perform, and information on user's completion of a training course.

12. The application security management system according to claim 7, wherein
the skill-information-based access control list includes accessibility information on accessibility to a type and/or an installation group of the edge device for each piece of skill information.

13. The application security management system according to claim 7, wherein
the skill information further includes at least one of information on qualification of each user, information on a group to which the user belongs, information on the edge device that the user can operate, information on a content of an operation that the user can perform, and information on user's completion of a training course.

* * * * *